(12) United States Patent
Wells et al.

(10) Patent No.: US 7,417,754 B2
(45) Date of Patent: Aug. 26, 2008

(54) WIRELESS PRINTING INTERFACE KIT AND METHOD

(75) Inventors: Trevor A. Wells, Vancouver, WA (US); Loren Chapple, Vancouver, WA (US); Robert P. Walrath, Battle Ground, WA (US); Denis A. Pochuev, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1496 days.

(21) Appl. No.: 09/947,261

(22) Filed: Sep. 5, 2001

(65) Prior Publication Data
US 2003/0043406 A1    Mar. 6, 2003

(51) Int. Cl.
*G06F 15/00* (2006.01)
*G06F 15/16* (2006.01)

(52) U.S. Cl. .................................. 358/1.15; 709/231

(58) Field of Classification Search ................ 358/1.15, 358/1.14, 1.16; 705/26, 34, 40, 14; 370/338, 370/354, 445; 709/203, 202, 220–221, 231, 709/250, 228; 455/500, 550.1, 41.3, 41.2, 455/557; 707/1, 100
See application file for complete search history.

(56) References Cited

U.S. PATENT DOCUMENTS

| | | | | |
|---|---|---|---|---|
| 5,933,778 | A * | 8/1999 | Buhrmann et al. | 455/461 |
| 7,117,504 | B2 * | 10/2006 | Smith et al. | 719/328 |
| 2002/0089691 | A1 * | 7/2002 | Fertlitsch et al. | 358/1.15 |
| 2003/0038963 | A1 * | 2/2003 | Yamaguchi | 358/1.15 |

FOREIGN PATENT DOCUMENTS

| | | |
|---|---|---|
| JP | 08300771 | 11/1996 |
| JP | 11-259262 | 9/1999 |
| JP | 11-327821 | 11/1999 |
| JP | 2000311129 | 11/2000 |
| JP | 2001005622 | 1/2001 |

OTHER PUBLICATIONS

Berkema, Alan, et al., Basic Printing Profile, Interoperability Specification, Bluetooth Special Interest Group, Printing Working Group, Revision 0.9, May 25, 2001.
"Specification of the Bluetooth System, Core, Version 1.0 B, Service Discovery Protocol (SDP)". Bluetooth Standard, Dec. 1, 1999.
Minttunkukka Paukkunen: "Wireless Application Protocol" Internet Citation, Apr. 14, 1999.
European Search Report for EP Patent Application No. 02256008 filed Aug. 29, 2002. Report issued Oct. 25, 2005 (The Hague).

* cited by examiner

*Primary Examiner*—Saeid Ebrahimi Dehkordy

(57) ABSTRACT

A kit, system, and associated methods are provided to facilitate wireless printing. In one embodiment, the system comprises a platform having a processor circuit having a processor and a memory. The system also includes a wireless printing logic stored in the memory and executable by the processor. The wireless printing logic comprises an application capable of a print operation and a number of hidden objects that encapsulate a number of wireless printing tasks associated with a wireless printing operation for the application. The wireless printing logic also includes at least one application programming interface (API) object that provides an interface between the application and the hidden objects, and, at least one platform specific object that encapsulates a number of adaptive wireless printing tasks that are configured for operation on the platform.

12 Claims, 7 Drawing Sheets

| Printer Directory Object 146a |
|---|
| |
| Init(IN BOOL getNames = False)<br>GetFirstDevice(OUT BTDeviceID ** pDevicePtr)<br>GetNextDevice(OUT BTDeviceID ** pDevicePtr)<br>GetNumDevices(OUT U32 * pNum)<br>FindDevice(IN const U8 * address, IN U8 addrLength,<br>                  OUT BTDeviceID ** pDevicePtr) |

FIG. 3A

| BTDeviceID Object 146e |
|---|
| |
| GetAddress(OUT U8 * addressBuff, INOUT U8* pLength)<br>GetName(OUT S8 * nameBuff, INOUT U32 * pLength) |

FIG. 3B

| Printer Object 146b |
|---|
| |
| Connect (IN Const U8 * pAddress, IN U8 addrLength, IN<br>              BOOL enableRefObj = FALSE)<br>Disconnect<br>Print(IN Document * pDoc)<br>Print(IN Job * pJob)<br>Get Attributes (Out PrinterAttribsResponse * pAttribs)<br>Cancel(IN Job * pJob) |

FIG. 3C

| Print Job Object 146c |
|---|
| SetDocument(IN Document * pDoc)<br>GetAttributes(OUT JobAttribResponse * pAttribs)<br>SetJobName()<br>SetJobOriginatingUserName()<br>SetDocumentFormat()<br>SetCopies()<br>SetSides()<br>SetNumberUp()<br>SetOrientationRequested()<br>SetMediaSize()<br>SetPrintQuality()<br>SetMediaType()<br>SetCancelOnLostLink() |

FIG. 3D

| Job Attribute Response Object 146f |
|---|
| GetJobID()<br>GetJobState()<br>GetJobStateReasons()<br>GetJobName()<br>GetJobOriginatingUserName()<br>GetJobMediaSheetsCompleted()<br>GetJobNumberOfInterveningJobs() |

FIG. 3E

| Printer Attribute Response Object 146g |
|---|
| GetPrinterName()
GetPrinterLocation()
GetPrinterState()
GetPrinterStateReasons()
GetFirstDocumentFormatSupported()
GetNextDocumentFormatSupported()
GetColorSupported()
GetMaxCopiesSupported()
GetFirstSideSupported()
GetNextSideSupported()
GetNumberUpSupported()
GetFirstOrientationSupported()
GetNextOrientationSupported()
GetFirstMediaSizeSupported()
GetNextMediaSizeSupported()
GetFirstMediaTypeSupported()
GetNextMediaTypeSupported()
GetFirstPrintQualitySupported()
GetNextPrintQualitySupported()
GetQueuedJobCount()
GetFirstImageFormatSupported()
GetNextImageFormatSupported()
GetFirstFontSupported()
GetNextFontSupported()
GetBasicTextPageWidth()
GetBasicTextPageHeight()
GetPrinterGeneralCurrentOp() |

FIG. 3F

| Document Object 146d |
|---|
| |
| GetLength(OUT U32* pLen)<br>Read( OUT U8* pBuffer, IN U32 bytesToRead,<br>        OUT U32* pBytesRead,<br>        OUT BOOL* pbFinished)<br>GetName(OUT S16* pName, INOUT U32* pLen)<br>GetMimeType(OUT S8* pMimeType, INOUT U32* pLen) |

FIG. 3G

| Link Management Adaptation Object 149b |
|---|
| |
| Inquire(IN LMINQCALLBACK cb, IN void* cbContext,<br>        IN LMSWAITFLAG<br>        lmswait=LMS_NOWAIT)<br>GetName(IN U8* bdaddr,OUT S8*name, INOUT<br>        U32*maxlen) |

FIG. 4A

| SDP Adaptation Object 149c |
|---|
| |
| QueryRemoteDevice() |

FIG. 4B

| OBS Adaptation Object 149d |
|---|
| |
| Connect(IN U8* bdaddr, IN OBS_CHANNEL channel)<br>Disconnect(IN OBS_CHANNEL channel)<br>Put(IN OBMessage* request, IN OBS_CHANNEL channel)<br>Get(IN  OBMessage* request,<br>                OUT OBMessage* response,<br>                IN  OBS_CHANNEL channel)<br>Abort(IN OBS_CHANNEL channel) |

FIG. 4C

| OS Adaptation Object 149a |
|---|
| |
| Assert()<br>Trace()<br>AllocMem( )<br>FreeMem( )<br>MemCopy()<br>MemSet()<br>MemCmp()<br>MemCmpEx()<br>U32toA()<br>AtoU32()<br>ConvUni2Ascii()<br>ConvAscii2Uni()<br>U32  Strlen()<br>S8 * StrStr() |

FIG. 4D

WIRELESS PRINTING INTERFACE KIT AND METHOD

TECHNICAL FIELD

The present invention is generally related to the field of printing and, more particularly, is related to a wireless printing interface kit and method.

BACKGROUND OF THE INVENTION

Existing print frameworks typically employ a printer driver architecture that converts a high-level page description language to a raster image that is suitable for printing by a destination printer. Such a printer driver architecture often requires intimate knowledge of a single page description language and a printer control language. Unfortunately, such a printer driver architecture also requires more resources then are available in many resource-limited platforms that suffer from a lack of printing capability. For example, in the Microsoft Windows environment, Graphic Device Interface (GDI) commands are often converted to a Printer Control Language such as PCL3 or other such language to send print output to printers. This causes resource intensive rendering to occur in the rendering platform. A resource-limited platform may not be able to perform such rendering tasks.

This printing approach also has other drawbacks. For example, to print according to a printer driver architecture, the user must use a printer driver that is specific to the platform and the printer. This can be problematic where a printer is available to print to, but the needed printer driver is unavailable. Another drawback is that the driver consumes a lot of computer processing power and memory resources.

SUMMARY OF THE INVENTION

In view of the foregoing, the present invention provides for a wireless printing interface kit embodied on a computer readable medium. In this respect, the wireless printing interface kit comprises a number of hidden objects that perform a number of wireless printing tasks associated with a wireless printing operation for an application. The kit further includes at least one application programming interface (API) object that provides an interface between the application and the hidden objects. The kit also includes at least one adaptive object template that specifies a number of adaptive wireless printing tasks that are configurable for a predefined platform upon which the application is executed.

In another embodiment, a method for configuring a wireless printing interface kit to facilitate wireless printing with an application is provided. In this regard, the method comprises the steps of providing a number of hidden objects in a computer system that perform a number of wireless printing tasks associated with a wireless printing operation for the application, altering the application to interact with at least one application programming interface (API) object that provides an interface between the application and the hidden objects, providing an adaptive object template that specifies a number of adaptive wireless printing tasks in a platform generic form, and, generating a platform specific object from the adaptive object template.

In still another embodiment, the present invention provides for a system to facilitate wireless printing. In this respect, the system comprises a platform having a processor circuit having a processor and a memory. The system also includes a wireless printing logic stored in the memory and executable by the processor. The wireless printing logic comprises an application capable of a print operation and a number of hidden objects that encapsulate a number of wireless printing tasks associated with a wireless printing operation for the application. The wireless printing logic also includes at least one application programming interface (API) object that provides an interface between the application and the hidden objects, and, at least one platform specific object that encapsulates a number of adaptive wireless printing tasks that are adapted for operation on the platform.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIGS. 3A-3G are block diagrams of a number of objects that act as an application programming interface (API) in the wireless printing interface of FIG. 2; and FIGS. 4A-4D are block diagrams of a number of objects that are configurable to adapt the wireless printing interface of FIG. 2 for operation of a predefined platform.

DETAILED DESCRIPTION OF THE INVENTION

Figure 1:
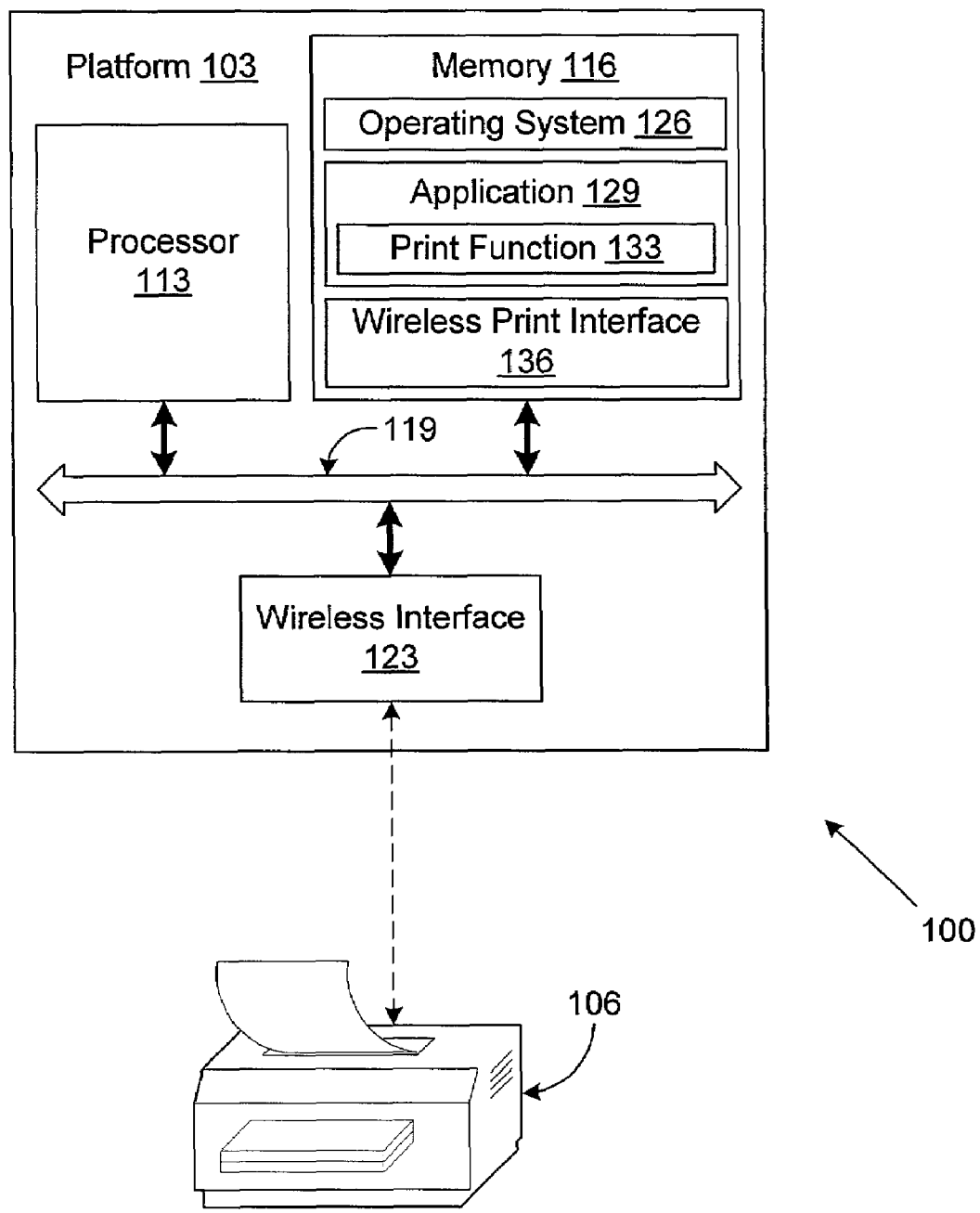
FIG. 1 is a block diagram of a wireless printing configuration according to an aspect of the present invention.

With reference to FIG. 1, shown is a wireless printing configuration 100 according to an aspect of the present invention. The wireless printing configuration 100 includes a platform 103 and a printer 106. The platform 103 may comprise, for example, a computer system, a personal digital assistant, or other such device with like capability. In this regard, the platform 103 includes a processor 113 and a memory 116, both of which are coupled to a local interface 119. The local interface 119 may be, for example, a data bus with an accompanying control/address bus as is generally known by those with ordinary skill in the art.

The platform 103 also includes a wireless interface 123 that is coupled to the local interface 119 and facilitates wireless communication with the printer 106. In this respect, the wireless interface 123 provides for the transmission and receipt of wireless signals to and from the printer 106. In this respect, the wireless interface 123 links the local interface 119 to the printer 106 so that the processor 113 can implement a print function with the printer 106, etc. Stored on the memory 116 and executable by the processor 113 are several components. These components include, for example, an operating system 126, an application 129 with a print function 133, and a wireless print interface 136.

Next a general discussion of an implementation of a print function using the wireless printing configuration 100 is provided to give context for the present invention. In this respect, the application 129 is executed on the platform 103 by a user in performing various functions. In this respect, the application 129 may be, for example, a word processor, spreadsheet, or other application 129 that includes a print function 133.

Assuming that a user initiates a print operation by manipulating the print function 133 of the application 129, then the wireless print interface 136 is employed to effect communications with the printer 106 in order to ultimately accomplish the printing of a document that was created for printing by the application 129.

In this respect, the wireless print interface 136 implements a wireless printing protocol in communicating back and forth with the printer 106. Such a protocol is described, for example, by Berkema, Alan, et al., *Basic Printing Profile, Interoperability Specification*, Bluetooth Special Interest Group, Printing Working Group, Revision 0.9, May 25, 2001, such protocol and standard being incorporated herein by reference. For purposes of the following discussion, this protocol is referred to herein as "the Bluetooth Protocol."

In addition, where the platform 103 is a computer system, for example, various peripheral devices may be employed therewith. Such peripheral devices may include, for example, a keyboard, keypad, touch pad, touch screen, microphone, scanner, mouse, joystick, or one or more push buttons, etc. The peripheral devices may also include a display device, indicator lights, speakers, and a printer, etc. Specific display devices may be, for example, cathode ray tubes (CRTs), liquid crystal display screens, gas plasma-based flat panel displays, or other types of display devices, etc.

The memory 116 may include both volatile and nonvolatile memory and data storage components. Volatile components are those that do not retain data values upon loss of power. Nonvolatile components are those that retain data upon a loss of power. Thus, the memory 116 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 113 may represent multiple processors and the memory 116 may represent multiple memories that operate in parallel. In such a case, the local interface 119 may be an appropriate network that facilitates communication between any two of the multiple processors, between any processor and any one of the memories, or between any two of the memories etc. The processor 113 may be electrical or optical in nature.

The operating system 126 is executed to control the allocation and usage of hardware resources in the platform 103. Specifically, the operating system 126 controls the allocation and usage of the memory 116, processing time, and the peripheral devices as well as performing other functionality. In this manner, the operating system 126 serves as the foundation on which applications depend as is generally known by those with ordinary skill in the art.

Figure 2:
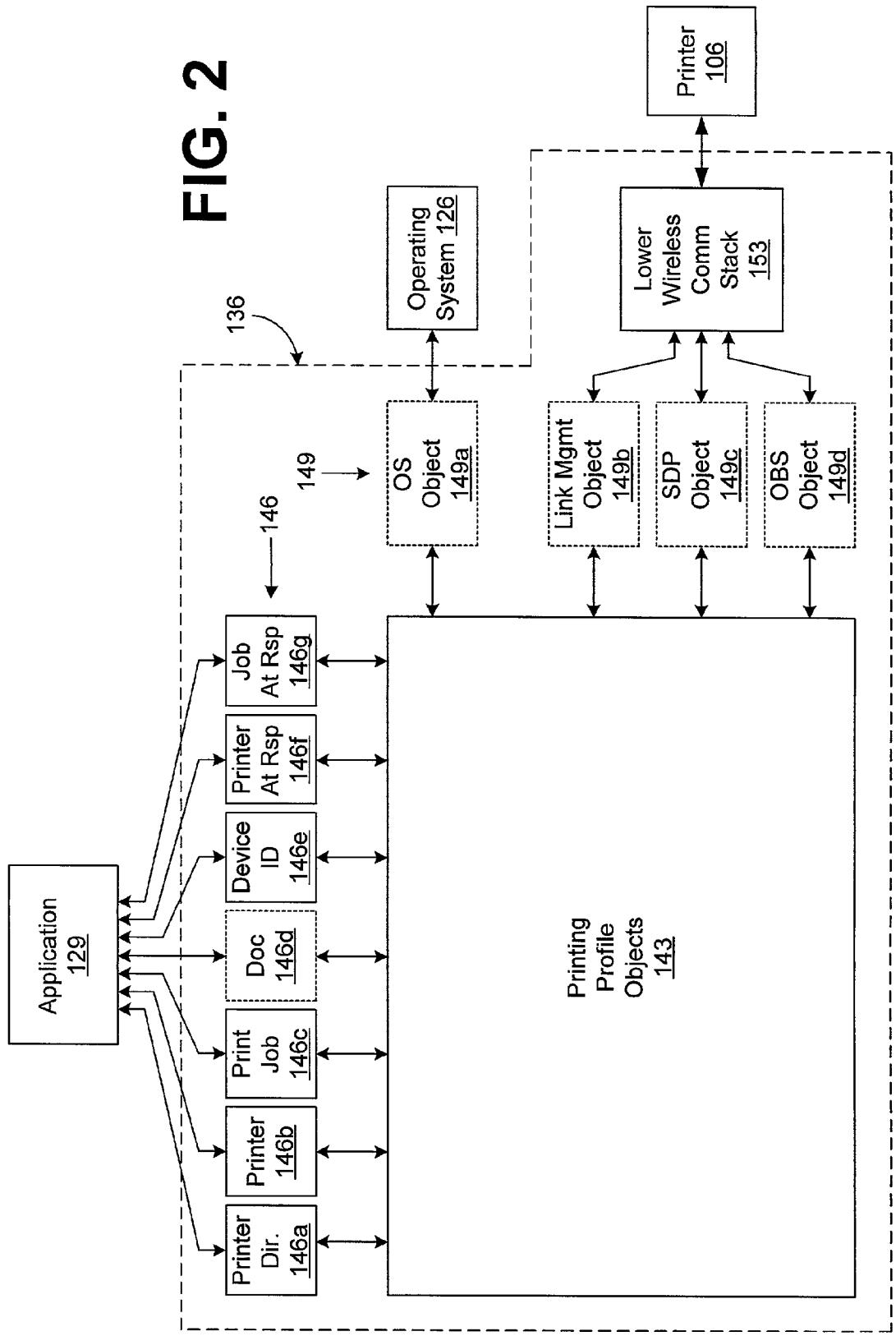
FIG. 2 is a block diagram of a wireless printing interface employed on a platform device in the wireless printing configuration of FIG. 1.

With reference to FIG. 2, shown is a functional block diagram of the wireless print interface 136 according to an aspect of the present invention. As shown in FIG. 2, each block represents a module, object, or other grouping or encapsulation of underlying functionality as implemented in programming code. However, the same underlying functionality may exist in one or more modules, objects, or other groupings or encapsulations that differ from those shown in FIG. 2 without departing from the present invention as defined by the appended claims. The wireless print interface 136 may be written in C++ or equivalent object oriented language as can be appreciated by those with ordinary skill in the art.

The wireless print interface 136 provides distinct advantages, including but not limited to, a reduction in the usage of processing resources in the platform 103 (FIG. 1) as compared to traditional print processing where the need to acquire and install a printer driver is eliminated. This is accomplished with a simple object oriented framework that is easily adapted to a predefined platform 103 and that facilitates easy application development for wireless printing capability.

The wireless print interface 136 may be embodied in the form of a kit that is adapted for operation with different applications 129 and on a multitude of platforms 103 as will be discussed.

The wireless print interface 136 includes a number of Basic Printing Profile (BPP) objects 143 that encapsulate methods that are executed in order to implement a wireless printing operation as set forth in the Bluetooth Protocol that was previously incorporated herein by reference. The wireless print interface 136 also includes a number of Application Programming Interface (API) objects 146. The API objects 146 act as an interface between the application 129 and the BPP objects 143. To explain further, the BPP objects 143 implement many different functions during a wireless printing operation. In order to accomplish a wireless print operation, the application 129 should communicate with the BPP objects 143.

However, such communication may be difficult for the average programmer to implement as the BPP objects 143 perform various tasks specified, for example, in the Bluetooth Protocol that are not familiar to such programmers. The API objects 146 advantageously provide a relatively simple, intuitive interface between the application 129 and the BPP objects 143. The programmer need only alter the application 129 so as to make proper calls to the various API objects 146. Consequently, a programmer need not spend the time to acquire an in depth understanding of the operation of the BPP objects 143 in order to adapt the application 129 to interface directly therewith.

When embodied as a kit, the wireless print interface 136 includes the API objects 146 that provide the interface through which the application 129 communicates with the BPP objects 143. The BPP objects 143 are also included therewith. The API objects 146 are configured to act as an intuitive interface that makes adapting the application 129 to interface therewith a relatively easy task. Specifically, the kit lists the methods within API objects 146 that are to be called by the application 129 to perform various tasks. To make the adaptation of the application 129 easier, these methods are encapsulated in specific ones of the API objects 146 where the methods would expect to be found.

The API objects 146 provide a level of abstraction of real world printing items or operations that are performed. For example, the API objects include a printer directory 146*a*, a printer 146*b*, a print job 146*c*, a document 146*d*, a device identifier 146*e*, a printer attribute response object 146*f*, and a job attribute response 146*g*. Such abstraction facilitates the easy adaptation of the application 129 to interface with the API objects 146. Specifically, given that the various methods encapsulated within the API objects 146 provide a level of abstraction from real world concepts and objects, then the various methods that are encapsulated therein are easier to find and manipulate.

The wireless print interface 136 also includes a number of adaptive objects 149. When in the form of the wireless printing interface kit, the adaptive objects 149 are embodied as adaptive object templates that specify a number of adaptive wireless printing tasks. These adaptive wireless printing tasks are configurable for the predefined platform 103 (FIG. 1) upon which the wireless print interface 136 is to be implemented. Thus, the adaptive object templates list the adaptive wireless printing tasks in a platform generic form that is non-platform specific. This facilitates easy adaptation of the adaptive object templates into adaptive objects 149 for a predefined platform 103.

The adaptive objects 149 that may be created from the corresponding adaptive object templates include an operating system object 149a that interfaces with the operating system 126 of the platform 103 (FIG. 1). The adaptive objects 149 may also include a link management object 149b, a service discovery protocol object 149c, and an object exchange protocol object 149d. These adaptive objects 149 interface with a lower wireless communications stack 153 to accomplish a wireless communications link with the printer 106. The functionality of the lower wireless communication stack 153 implements various tasks described, for example, in the Bluetooth Protocol that was incorporated herein by reference above. As such, the operation of the lower wireless communication stack 153 is not herein in detail.

When embodied as a kit, the wireless print interface 136 provides the adaptive object templates that specify a number of adaptive wireless printing tasks in a platform generic form. In adapting the wireless printing interface kit with a specific application 129 and on a predetermined platform 103 (FIG. 1), the user generates the adaptive objects 149 from the corresponding adaptive object templates. For example, the operating system object 149a is adapted from a corresponding adaptive object template so that the BPP objects 143 can communicate effectively with the operating system 126 of the platform 103. This provides for the allocation of memory and other tasks accomplished by the operating system 126 to facilitate the operation of the wireless print interface 136.

The link management object 149b, the service discovery protocol object 149c, and the object exchange protocol object 149d include methods that perform various wireless printing tasks associated with a predefined wireless printing configuration implemented on the platform 103. Specifically, the lower wireless communication stack 153 may be different depending on the particular platform 103. The adaptive objects 149 thus perform various tasks relative to the specific wireless printing protocol configuration implemented on the platform 103.

The BPP objects 143 are characterized herein as hidden objects because either they do not communicate directly with the application 129 or the methods encapsulated within the BPP objects 143 are not changed in order to adapt the wireless print interface kit for a particular platform 103. The BPP objects 143 included in a kit embodying the wireless printing interface 136 makes it easy for programmers to provide for the wireless printing of documents based upon the manipulation of the application 129. Specifically, all the programmer need do is alter the application 129 to interface with the API objects 146 and adapt the adaptive object templates to generate corresponding adaptive objects 149 therefrom. The programmer advantageously need not access and alter any of the BPP objects 143 due to their hidden nature. Thus, the present invention reduces the investment of time and effort necessary to provide for wireless printing for a predetermined application 129 on a predefined platform 103 by providing a kit that is relatively easy to adapt. In the following figures, specific objects of the wireless printing interface 136 are discussed. By way of example, these objects may include various parameters, although other parameters may be employed.

With reference to FIG. 3A, shown is a diagram of the printer directory object 146a. The printer directory object 146a encapsulates method called by the application 129 (FIG. 1) to obtain a list of printers 106 (FIG. 1) with which a wireless printing operation may be performed. In the context of the Bluetooth Protocol, for example, the list of printers is created using the Bluetooth inquiry process that is used to discover Bluetooth devices that are in range and configured to be discoverable as can be appreciated by those with ordinary skill in the art. Upon completion of the Bluetooth inquiry process, various devices may be identified within range that may not be printers 106. The devices identified are filtered to identify only printing devices 106 that are then maintained in the printer directory object 146a.

The principle methods in the printer directory object 146a include an initiation method that initializes the printer directory object 146a. The initiation method causes a Bluetooth inquiry procedure to be conducted by manipulating various ones of the BPP objects 143 (FIG. 2). When the parameter "GetNames" is set to equal true, each corresponding device will be asked for its "friendly name" as can be appreciated by those with ordinary skill in the art. The "GetFirstDevice" method returns a pointer associated with the printer directory encapsulated in the printer directory object 146a to the first device listed therein. Similiarly, the "GetNextDevice" method cycles the pointer to information about a next device in the same printer directory. The "GetNumDevices" method is used to determine the number of devices listed in the printer directory. Finally, the "FindDevice" is a method that returns the pointer to information about a device that has a specified Bluetooth device address.

With reference to FIG. 3B, shown is a Bluetooth device identifier (ID) object 146e according to an aspect of the present invention. The Bluetooth device identifier object 146e is used by the application 129 to get information about a particular Bluetooth device, for example such as the printer 106 (FIG. 1). In this regard, the Bluetooth device ID object 146e includes a "GetAddress" method that is used to access a six byte Bluetooth device address of a respective device. The "GetName" method is executed to access a friendly name of a respective device in communication with the platform 103 (FIG. 1). Note that the various methods in the Bluetooth device ID object 146e are thus called by the printer directory object 146a in establishing those printers 106 that are within range of the platform 103 at any given time.

With reference then to FIG. 3C, shown is a diagram of the printer object 146b according to an aspect of the present invention. The printer object 146b is employed by the application 129 to connect to and interact with the printer 106 (FIG. 1). The methods in the printer object 146b include the "Connect" method that is used by the application 129 to connect to the printer 106. To connect to the printer 106, the Bluetooth device address of the printer 106 is thus provided by the application 129. The Bluetooth device address may be obtained from the printer directory object 146a. Upon successful completion, a communication channel is opened to the basic printing profile service of the printer 106 as can be appreciated by those skilled in the art upon examining the Bluetooth protocol.

The "Disconnect" method in the printer object 146b is called by the application 129 (FIG. 2) to close the connection to the printer 106. The "Print" method is called by the application 129 to print a document on the printer 106 with which the printer object 146b maintains a current open connection.

The document object 146*d* (FIG. 2) contains the document or a reference to the document that is to be printed. The printer object 146 also includes a second "Print" method that is called by the application 129 to print a document as part of a configured print job on the printer 106 with which the printer object 146*b* currently maintains a connection. The document to be printed along with the job configuration settings that are associated therewith are centered within the print job object 146*c*. This method uses the basic printing profile "JobBased-Printing" procedure specified in the Bluetooth protocol. Finally, the "Cancel" method is called by the application 129 to cancel an active print job.

With reference to FIG. 3D, shown is a block diagram of the print job object 146*c* according to another aspect of the present invention. The print job object 146*c* is called by the application 129 (FIG. 1) to represent a print job. The print job object configures the print job. Also, the application 129 may call various methods within the print job object 146*c* to find out the status of a print job such as, for example, waiting to print, printing, or completed printing, etc. The print job object 146*c* includes a "set document" method that is called by application 129 to add a document to the print job object 146*c* itself. Ultimately, this is the document that will be printed when the print job is submitted to the printer 106 (FIG. 1) via the printer object 146*b* (FIG. 3C). The print job object 146*c* also includes a "GetAttributes" method that is called by the application 129 to acquire the print job attributes of a print job that has been submitted to the printer 106. This method employs a "GetJobAttributes" command that is defined by the basic printing profile of the Bluetooth protocol.

The specific job attributes are defined by the Bluetooth protocol as can be appreciated by those with ordinary skill in the art. These job attributes are ultimately accessed by the application 129 through the job attribute response object 146*g* (FIG. 2). The remaining methods in the print job object 146*c* are called by the application 129 to configure the print job by setting or assigning values to the various job attributes defined in the Bluetooth protocol. These attributes are initialized to default values when the print job object 146*c* is first created.

With reference to FIG. 3E, shown is a block diagram of the job attribute response object 146*f*. The job attribute response object 146*f* is called by the application 129 (FIG. 1) to obtain information about a particular print job that has been submitted to the printer 106 (FIG. 1). In this respect, the job attribute response object 146*f* ultimately causes the implementation of appropriate communications with the printer 106 pertaining to the status of the current print job. The methods associated with the job attribute response object 146*f* are called by the application 129 to access the job attributes that were returned in the response to the "GetJobAttributes" request in the print job object 146*c*. Each of the attributes is described in the Bluetooth protocol. Ultimately, the job attributes information is received from the printer 106 and stored in the job attribute response object 146*f* using the "GetAttributes" method of the print job object 146*c* (FIG. 3D).

Referring next to FIG. 3F, shown is a block diagram of the printer attribute response object 146*g*. The printer attribute response object 146*g* is called by the application 129 (FIG. 1) to obtain information about the printer 106 (FIG. 1) and its capabilities. As shown, the methods associated with the printer attribute response object 146*g* are called to access the printer attributes that are obtained in response to the "GetPrinterAttributes" request that is called from the printer object 146*b* (FIG. 3C). Each of the attributes obtained from the printer 106 is described in the Bluetooth protocol.

Referring next to FIG. 3G, shown is a block diagram of the document object 146*d* according to an aspect of the present invention. The document object 146*d* is used by the application 129 (FIG. 1) to provide access to the contents of a respective document to the wireless print interface 136 (FIG. 2). In doing so, the actual document is selected and linked to the document object 146*d*. For example, the document object 146*d* may accomplish this task by generating a dialogue box that is displayed for a user that allows the user to select a document file for printing.

The document object 146*d* also includes a "GetLength" method that is called to determine the length, in bytes, of the document to be printed. A "Read" method is provided in the document object 146*d* that is called to read a specified number of bytes from the document into a buffer starting at a currently maintained position in the document. The "initialize" method first identifies this maintained position at the beginning of the document. The "GetName" method is called by the application to obtain a name of the document itself. The document name may be, for example, the name of the file that contains the document content on file based systems, etc. The document object 146*d* also includes a "GetMimeType" method that is employed to obtain the mime type of the contents of the particular document in question. Examples of mime types include "Application/VNE.PWG-XHTMLPrint+XML:1.0" for "XHTML-Print" contents, "Text/Plain" for plain text documents, and "Image/Joint Photographic Experts Group (JPEG)" for JPEG documents as is generally known by those with ordinary skill in the art.

With reference to FIG. 4A shown is the link management adaptation object 149*b* according to an aspect of the present invention. The link management adaptation object 149*b* is employed to access the link management services of the Bluetooth stack as specified in the Bluetooth protocol. The link management adaptation object 149*b* includes an "Inquire" method that is called to initiate the Bluetooth inquiry process. The Bluetooth inquiry is employed to discover which Bluetooth devices are in range of the inquiring device and are configured to respond to such discovery. For each device that responds, the initiator supplied call back method is called and passed a pointer to information about the device.

The link management adaptation object 149*b* also includes a "GetName" method that is provided to get a friendly name of the device specified by the six byte Bluetooth device address. When embodied in a kit, the methods of the link management adaptation object 149*b* are expressed in a platform generic form that indicates to a user what methods are to be adapted for a specific platform 103 (FIG. 1), etc. In adapting the kit to operate on a specific platform 103, the methods are converted from the platform generic form into a language that is native to the platform 103 or that is implemented on the platform 103.

With reference to FIG. 4B, shown is a block diagram of the service discovery protocol (SDP) adaptation object 149*c* according to an aspect of the present invention. The SDP adaptation object 149*c* includes a "QueryRemoteDevice" method that is called to query the remote device such as the printer 106 (FIG. 1) to obtain desired records or information therefrom. Such information may include, for example, details about the printer 106 itself as well as its capabilities as defined in the Bluetooth protocol.

Turning then to FIG. 4C, shown is a block diagram of the object exchange (OBEX) adaptation object 149*d* according to an aspect of the present invention. The OBEX adaptation object 149*d* includes a "Connect" method that is employed to create a connection to the basic printing profile service on the printer 106 (FIG. 1) as specified, for example, by the Bluetooth protocol. In creating such a connection, a job channel and a status channel may also be connected. However, the status channel is only connected when there is an existing job channel connection. The OBEX adaptation object 149d also includes a "Disconnect" method that is employed to close the job or status channel connection between the platform 103 (FIG. 1) and the printer 106. The OBEX adaptation object 149d also includes a "Put" method that is employed to execute an OBEX Put command via a specified channel as specified, for example, in the Bluetooth protocol. The channel must have been previously opened using the "Connect" method. A "Get" method is used to execute an OBEX get command via a specified channel. Similar to the "Put" method, the channel must have been previously opened using the "Connect" method. In addition, the OBEX adaptation object 149d includes an "Abort" method that is used to execute an OBEX abort command via the specified channel, where the channel has been previously opened using the "Connect" method. The OBEX abort command is used to cancel a previously issued OBEX get or put request without waiting for the response from the printer 106.

With reference to FIG. 4D, shown is the operating system (OS) adaptation object 149a according to an aspect of the present invention. The OS adaptation object 149a includes the "Assert" and "Trace" methods that are employed for software quality monitoring. Specifically, these methods are employed to trace the flow of execution and to raise an alert if some expected condition is not met as can be appreciated by those with ordinary skill in the art. The OS adaptation object 149a also includes a "AllocMem" method and a "FreeMem" method that are used to dynamically allocate in free blocks of the memory 116 (FIG. 1) as can be appreciated by those with ordinary skill in the art.

The OS adaptation object 149a also includes a "Mem-Copy" method, a "MemSet" method, a "MemCMP" method, and a "MemCMPEX" method that operate on various blocks of the memory 116 as appropriate. Specifically, these methods are employed to copy values from one block to another, to set values within the memory 116, and to compare the contents of two memory blocks as can be appreciated by those with ordinary skill in the art. The "U32toA" method and AtoU32 method are both used to convert a 32 byte number to and from an American Standard Code II (ASCII) string as can be appreciated by those with ordinary skill in the art. The remaining methods in the OS adaptation object 149a are employed to convert a Unicode string to and from an ASCII string. Also, these methods are employed to determine the length of a string and define the position of a substring within a string as can be appreciated by those with ordinary skill in the art.

Although the wireless print interface 136 (FIG. 2) and the corresponding wireless print interface kit of the present invention is embodied in software or code executed by general purpose hardware as discussed above, as an alternative the same may also be embodied in dedicated hardware or a combination of software/general purpose hardware and dedicated hardware. If embodied in dedicated hardware, the wireless print interface 136 (FIG. 2) and the corresponding wireless print interface kit can be expressed or implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram of FIG. 2 and the objects of FIGS. 3A-4D show the architecture, functionality, and operation of an implementation of the wireless print interface 136 (FIG. 2) and the corresponding wireless print interface kit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagram of FIG. 2 and the objects of FIGS. 3A-4D may show a specific order of execution, it is understood that the order of execution may differ from that which is depicted. For example, the order of execution of two or more methods may be scrambled relative to the order shown. Also, two or more methods shown as executed in succession in FIGS. 3A-4D may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the block diagram of FIG. 2 and the objects of FIGS. 3A-4D are relatively self-explanatory and are understood by those with ordinary skill in the art to the extent that software and/or hardware can be created by one with ordinary skill in the art to carry out the various logical functions as described herein.

Also, where the wireless print interface 136 (FIG. 2) and the corresponding wireless print interface kit comprises software or code, both can be embodied in any computer-readable medium for use by or in connection with an instruction execution system such as, for example, a processor in a computer system or other system. In this sense, the wireless print interface 136 and the corresponding wireless print interface kit may comprise, for example, statements including instructions and declarations that can be fetched from the computer-readable medium and executed by the instruction execution system. In the context of the present invention, a "computer-readable medium" can be any medium that can contain, store, or maintain the wireless print interface 136 (FIG. 2) and the corresponding wireless print interface kit for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A wireless printing interface kit embodied on a computer readable medium, comprising:
    a number of hidden objects that perform a number of wireless printing tasks associated with a wireless printing operation for an application, wherein the hidden objects do not communicate directly with the application;
    at least one application programming interface (API) object that provides an interface between the application and the hidden objects; and
    at least one adaptive object template that specifies a number of adaptive wireless printing tasks that are configurable for the predefined platform upon which the application is executed wherein the at least one API object further comprises a printer object that encapsulates number of method associated with a predefined printer and the at least one API object further comprises a document object that encapsulates a number of methods associated with a predefined document.

2. The wireless printing interface kit embodied on a computer readable medium of claim 1, wherein the at least one API object further comprises a print job object that encapsulates a number of methods associated with a predefined print job.

3. The wireless printing interface kit embodied on a computer readable medium of claim 1, wherein the adaptive wireless printing tasks are configurable to interface with an operating system of the platform.

4. The wireless printing interface kit embodied on a computer readable medium of claim 1, wherein the adaptive wireless printing tasks are associated with a predefined wireless printing configuration native to the platform.

5. A system to facilitate wireless printing, comprising:
    a platform having a processor circuit having a processor and a memory;
    wireless printing logic stored in the memory and executable by the processor, the wireless printing logic comprising:
        an application capable of a print operation;
        a number of hidden objects that encapsulate a number of wireless printing tasks associated with a wireless printing operation for the application, wherein the hidden objects do not communicate directly with the application;
        at least one application programming interface (API) object that provides an interface between the application and the hidden objects; and
        at least one platform specific object that encapsulates a number of adaptive wireless printing tasks that are adapted for operation on the platform wherein the adaptive wireless printing tasks are performed by a number of methods that are adapted to interface with an operating system of the platform; and the adaptive wireless printing tasks are preformed by a number of methods associated with a predefined wireless printing configuration native to the platform.

6. The system of claim 5, wherein the at least one API object further comprises a printer object that embodies an abstraction of a predefined printer.

7. The system of claim 5, wherein the at least one API object further comprises a document object that embodies an abstraction of a predefined document.

8. The system of claim 5, wherein the at least one API object further comprises a print job object that embodies an abstraction of a predefined print job.

9. A program embodied on a computer readable medium to facilitate wireless printing, comprising:
    code encapsulated in a number of hidden objects that performs a number of wireless printing tasks associated with a wireless printing operation initiated by an application executed on the platform, wherein the hidden objects do not communicate directly with the application;
    code encapsulated in at least one application programming interface (API) object that provides an interface between the application and the hidden objects; and
    code encapsulated in at least one platform specific object that performs a number of adaptive wireless printing tasks that are adapted for operation on the platform wherein the adaptive wireless printing tasks are performed by a number of methods that are adapted to interface with an operating system of the platform; and the adaptive wireless printing tasks are preformed by a number of methods associated with a predefined wireless printing configuration native to the platform.

10. The program embodied on a computer readable medium of claim 9, wherein the at least one API object further comprises a printer object that embodies an abstraction of a predefined printer.

11. The program embodied on a computer readable medium of claim 9, wherein the at least one API object further comprises a document object that embodies an abstraction of a predefined document.

12. The program embodied on a computer readable medium of claim 9, wherein the at least one API object further comprises a print job object that embodies an abstraction of a predefined print job.

* * * * *

UNITED STATES PATENT AND TRADEMARK OFFICE
CERTIFICATE OF CORRECTION

PATENT NO. : 7,417,754 B2
APPLICATION NO. : 09/947261
DATED : August 26, 2008
INVENTOR(S) : Trevor A. Wells et al.

Page 1 of 1

It is certified that error appears in the above-identified patent and that said Letters Patent is hereby corrected as shown below:

In column 12, line 10, in Claim 5, delete "preformed" and insert -- performed --, therefor.

In column 12, line 39, in Claim 9, delete "preformed" and insert -- performed --, therefor.

Signed and Sealed this

Nineteenth Day of May, 2009

JOHN DOLL
*Acting Director of the United States Patent and Trademark Office*